United States Patent [19]

Weber et al.

[11] Patent Number: 5,133,833

[45] Date of Patent: Jul. 28, 1992

[54] PROCESS FOR REPULPING OF FIBER-LATEX BINDER COMPOSITES

[75] Inventors: Robert E. Weber; Patricia A. Jegier, both of Marietta, Ga.; Edwin G. Greenman, Appleton, Wis.

[73] Assignee: Kimberly-Clark Corporation, Neenah, Wis.

[21] Appl. No.: 661,800

[22] Filed: Feb. 26, 1991

[51] Int. Cl.$^5$ .............................................. D21C 5/02
[52] U.S. Cl. ......................................... 162/8; 162/60
[58] Field of Search ..................... 162/8, 13, 60, 191

[56] References Cited

U.S. PATENT DOCUMENTS

| | | | |
|---|---|---|---|
| 3,287,149 | 11/1966 | Dooley | 162/8 |
| 3,766,001 | 10/1973 | Gleason et al. | 162/8 |
| 3,873,411 | 3/1975 | Drelich et al. | 162/8 |
| 4,162,186 | 7/1979 | Wood et al. | 162/8 |
| 4,420,368 | 12/1983 | Drach | 162/8 |
| 4,735,682 | 4/1988 | Didwania et al. | 162/8 |

Primary Examiner—Karen M. Hastings
Attorney, Agent, or Firm—Patrick C. Wilson

[57] ABSTRACT

Disclosed herein is a process for repulping or reclaiming fibers from latex-impregnated materials such as latex impregnated papers. The process involves treating the latex-impregnated material with an alkali solution for a sufficient period of time to separate the latex polymer from the fibers. This is followed by a washing step to rinse away the latex polymer thereby leaving the reclaimed fibers for subsequent use such as the formation of new paper stock.

8 Claims, 1 Drawing Sheet

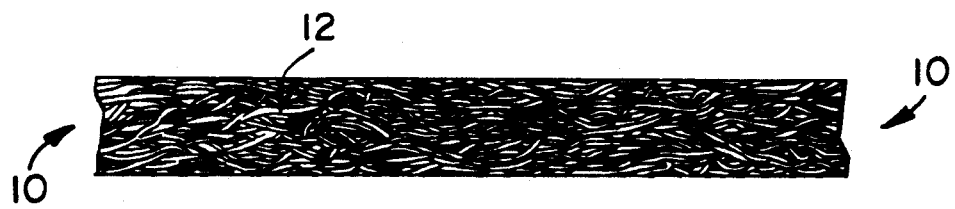
FIG. 1
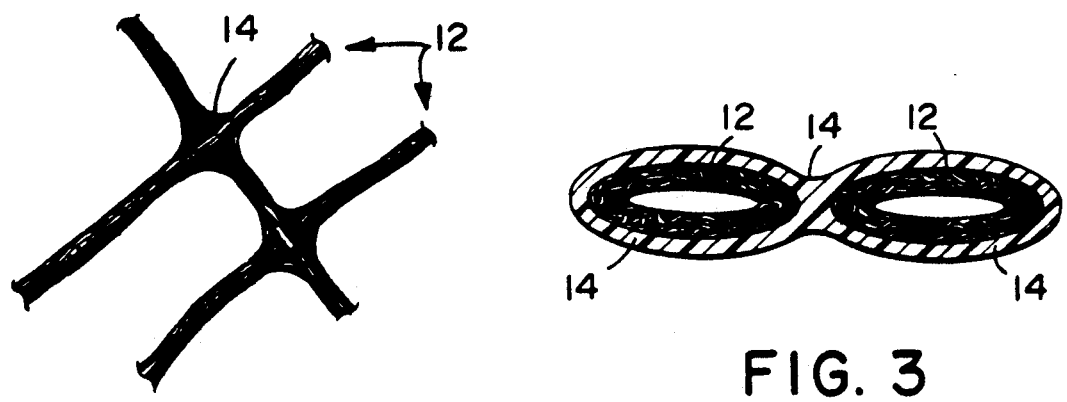
FIG. 2
FIG. 3
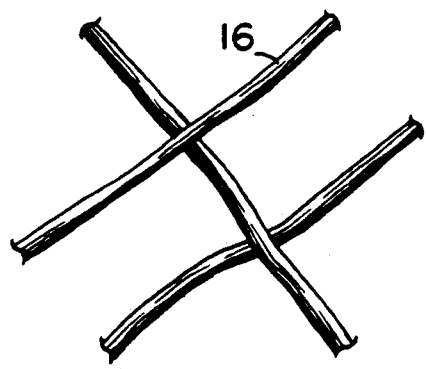
FIG. 4

PROCESS FOR REPULPING OF FIBER-LATEX BINDER COMPOSITES

The present invention relates to a process for repulping or reclaiming fibers from latex impregnated materials. More specifically the process employs alkali solutions such as NaOH to react with the latex binder material and free it from the fibers. Thereafter the fibers and dissolved latex may be washed through a fine mesh screen to dispose of the latex binder thereby leaving the reclaimed pulp for further use.

Latex treated and impregnated papers are widely used in a number of applications. Many times during the formation of such papers the production requirements are such that the paper thus formed does not meet specification and therefore the paper must be disposed of in some manner such as by land filling. When such situations occur, it is both a waste of the product and an undesirable addition to the already growing landfill space requirements. While is has been possible to reclaim other lighter duty materials in the past using such alkali solutions, it is the applicants' belief that heretofore such reclamation processes have not been possible with more durable, higher latex/fiber materials. This is because with high latex polymer impregnation processes, the fibers are generally completely coated by the latex binder thereby making repulping difficult. This is further complicated by the high wet strength properties of the formed material.

It is therefore an object of the present invention to provide a process for the repulping of such fiber/latex binder composites. It is a further object of the present invention to provide such a process which is economical in nature. It is still a further object of the present invention to provide a reclaimed pulp which has the general characteristics of an alpha pulp which is a premium market pulp due to its purity and the fact that it is a high molecular weight cellulose. These and other objects of the present invention will become more apparent upon a further review of the following specification, drawings and claims.

SUMMARY OF THE INVENTION

A process for reclaiming or repulping fibers from latex impregnated webs is disclosed herein. While the process is primarily intended for the reclamation of cellulosic fibers from paper stock, the process of the present invention is also intended for use with synthetic fibers and combinations of natural and synthetic fibers bonded together with latex polymer.

The process of the present invention involves the use of an alkali solution to react with and remove the latex polymer binder from the fibers. Suitable alkali materials include, but are not limited to, sodium hydroxide, potassium hydroxide and sodium carbonate. Once formed, the alkali solution should have a pH value greater than or equal to 11, preferably greater than or equal to 12.5 and most preferably greater than or equal to 13. The percent solution of the alkali material should generally be between about 0.5% and 10.0% by weight with solutions working best when they are in the range of approximately 1-2%.

The actual process of the present invention first involves combining the latex/fiber material with an alkali solution to form a slurry. In the simplest process the slurry may be allowed to react undisturbed for an amount of time sufficient to release the latex from the fibers. To reduce the reclamation time, however, the slurry may be heated and/or stirred to enhance the separation of the latex polymer from the fibers. Generally, heating the slurry to a temperature above 70° C. will shorten the process time as will stirring the slurry.

With certain latex polymers such as acrylic latex polymers the slurry will turn into a gel as the polymer releases from the fiber. The latex polymer may be removed from the fibers in the slurry by washing the slurry through a fine sieve to remove the latex binder and leave the reclaimed fibers for subsequent use. With other polymers such acrylonitrile butadiene latex the polymer does not dissolve but, instead, forms discrete particles which remain in the alkali solution. As performed with the first step, the washing step also may be performed using elevated temperatures to quicken the process. Heating the washing water to a temperature above 55° C. has been shown to be advantageous. In certain cases, partially acidifying the washing water to a pH value less than or equal to 6 will facilitate the removal of the latex binder. Once the fibers have been washed and reclaimed they may be reprocessed to form new paper stock using known paper making processes. Alternatively, it has been found that the process of the present invention may be terminated before the washing step and the slurry can be used in conjunction with known paper making processes to form paper directly from the slurry. This process is considered to be equally within the scope of the present invention.

BRIEF DESCRIPTION OF THE DRAWINGS

FIG. 1 is a side view of a latex impregnated cellulosic web suitable for use with the process of the present invention.

FIG. 2 is a perspective view of several latex coated cellulosic fibers within the web of FIG. 1.

FIG. 3 is a representative cross-sectional view of two cellulosic fibers within the web of FIG. 1 being joined to one another by way of the latex polymer coating.

FIG. 4 is another perspective view, similar to that of FIG. 2, showing the cellulosic fibers after the latex polymer had been removed by way of the process of the present invention.

DETAILED DESCRIPTION OF THE INVENTION

The present invention relates to a process for reclaiming or repulping various types of fiber composites which have been previously bound together by latex or some other type of binder which is dissolvable or dispersible in an alkali solution. Most commonly, such fibers are cellulosic fibers from latex impregnated paper making processes. However, the process is intended to be compatible with other types of fibers including glass and thermoplastic fibers generally referred to as synthetic fibers as opposed to the cellulosic fibers which are termed natural fibers. Furthermore, there may be mixtures of fibers including mixtures of different types of natural fibers as well as mixtures of both natural and synthetic fibers. Many fibers such as glass and polyolefin fibers will not be adversely affected when placed into alkali solutions. However, other fibers such as polyester fibers may break down if exposed to either sufficiently strong alkali solutions or alkali solutions for a sufficient period of time. As a result, care should be taken when applying this process to certain fibers and it therefore may be wise to run small experimental batches before undertaking large scale repulping processes according to the present invention.

One of the advantages of the present invention is the fact that this process will permit the reclamation of fibers which have been heavily coated and impregnated with binder material. As shown in FIG. 1, a latex impregnated cellulosic web 10 consists of a network of latex encapsulated fibers 12. Referring to FIGS. 2 and 3, the fiber to fiber bonding of the fibers 12 is through the latex polymer component 14. See in particular FIG. 3 which shows a cross section of two cellulose fibers 12 bonded through the latex polymer 14. By using an alkali solution in accordance with the process of the invention, the latex polymer 14 can be removed thereby leaving the reclaimable cellulose fibers 16. See FIG. 4.

Binder materials for which the process of the present invention is particularly well suited are binders that will dissolve and chemically react with an alkali solution. The process of the present invention has been shown to be useful with respect to latex binders and in particular with respect to acrylic latex binders. It has been found that when fiber-latex composite web materials are exposed to alkali solutions, the fibers are released from the acrylic polymer. The polyacrylate ester latex polymers in these composites are converted to polyacrylic acid salts which are soft, water soluble gels. The general reaction for this chemical process is shown by the following equation.

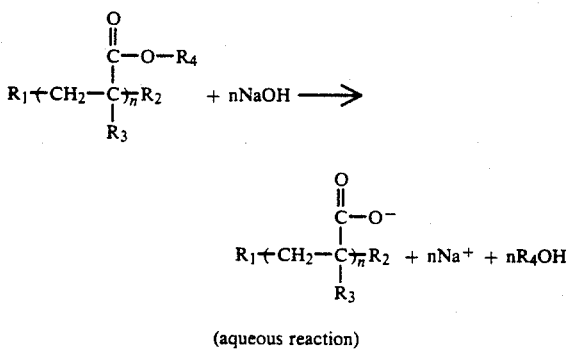

(aqueous reaction)

$R_1$, $R_2$ —are extensions of the polyacrylate ester polymer, but may contain other vinyl monomers such as styrene, vinyl chloride, etc., however the major monomers are acrylate and methacrylate esters $R_3$ —are H—, $CH_3$—

$R_4$ —are $C_nH_{n+1}$—(n=0 to about 6)

These gels in turn can be washed from the fibers, thereby permitting the reclamation of the fibers free in most cases from all latex acrylic polymer. Once the fibers have been reclaimed, they have the general characteristic of an alpha pulp, which is a premium market pulp because of its purity and content of high molecular weight cellulose.

The alkali solution should have a pH value greater than or equal to 11, preferably greater than or equal to 12.5 and most preferably greater than or equal to 13. The percent solution of the alkali compound should generally be between about 0.5% and 10.0% by weight. It has been found that the alkali solution works best when it is dilute in nature, generally in the range of 1-2%. To drive the above described conversion of the polyacrylate ester to a polyacrylate acid salt it has been found that it is best to use approximately 20 dry parts by weight of a NaOH equivalent alkali to 100 dry parts fiber/polymer composite. This typically equates to about a 2% solution when the fiber/polymer composite pulp is at an 8% consistency.

The process first involves the preparation of the binder impregnated and/or coated paper. For purposes of illustration only the present invention will be described with respect to the repulping of cellulosic fibers which have been covered with an acrylic latex binder material. It is helpful if the latex impregnated web is chopped, cut or ground into small pieces, preferably 60 $cm^2$ or smaller, to increase the fiber/latex surface area thereby speeding up the repulping process. Next, the alkali solution should be prepared. Suitable alkali materials include but are not limited to NaOH, KOH and $Na_2CO_3$. Once the alkali solution has been formed in proper concentration, the alkali solution and the paper are combined in a specified ratio as set forth above. If time is not critical, the mixture can be left to stand with little or no mixing or addition of heat and with sufficient time the acrylic latex will separate from the fibers to form a gel which can then be washed from the fibers. To speed up the process several other steps may be employed either individually or in conjunction with one another to reduce the amount of time necessary for reclaiming the fibers. The first process enhancer is stirring or beating the mixture to cause further abrasion between the pieces of paper and ultimately the fibers to remove the latex binder. The second process enhancer is the use of heat to elevate the temperature of the mixture which also causes the fiber reclamation process to quicken. Generally, the higher the temperature, the faster the reaction time of the process. Temperatures above 70° C. have proven to be advantageous and temperatures in the range of 100° C. have been found to work best. As shown in the examples below, when the mixture is heated to 100° C. the process of removing the acrylic latex from the fibers can be completed in 1 to 2 hours. As stated earlier, the heating of the mixture can be used either alone or in combination with a stirring or beating of the slurry to quicken the reclamation.

Once the latex binder has been separated from the fibers, the pulp/fiber mixture is generally in the form of a gel. As a result, it is necessary to wash the latex binder gel from the fibers so that the fibers may be reclaimed. This is done by diluting the gelatinous mixture to separate and wash the released latex binder from the fibers. The washing step includes passing the mixture through a fine sieve to allow the dissolved latex binder to pass through the sieve while retaining the fibers on top of the sieve surface. On a production scale, pressure screens, and washers commonly used in wet deinking processes would be used.

While the washing step can be done in cold water, warm water works better to remove the gelatinous binder material. Typically, elevated water temperatures in the range of 55°-100° C. work well with the best removal being brought about at the higher end of this range. In addition, it has been found that partial acidification of the washing water may be advantageous in certain cases to facilitate the removal of the gel.

The fibers, once reclaimed, whether they be natural, synthetic or a combination of the two, may then be used to form new sheet stock material such as paper without the addition of any other materials. If desired, these reclaimed fibers may be added with other fibers (synthetic or natural) as well as new binder material to form more durable sheet stock. It has also been found that the process can be terminated prior to the washing step and the gelantious mixture of fibers and binder may be used without the washing step to make new paper stock.

To better understand the process of the present invention, a series of experiments were run to confirm the efficacy of the process. These experiments are set forth in Examples I-X below.

EXAMPLE I

A cellulose web of soft wood kraft fiber with a basis weight of 44 g/m$^2$ was saturated with a latex emulsion of a self crosslinking polyethylacrylate polymer with a glass transition temperature (Tg) of $-15°$ C. (Hycar ® 26322 from B. F. Goodrich Co.). The composite was dried to remove all water and then cured at 107° C. for one hour to cross link the latex polymer in order to provide high durability and high wet strength. The final composite consisted of 52 dry parts latex polymer for every 100 dry parts cellulose fiber. The average dry tensile strength of this product was 276 kg/m with a wet to dry tensile strength ratio of 0.42. This type of composite can be used as a tape backing or protective masking composite.

The water-insoluble, durable product so produced was repulped in a 2% solution of NaOH. A 2% slurry of the cellulose composite was cooked at 100° C. for 40 minutes in a stainless steel beaker. The solution consisted of 800 g of 2% NaOH and 16 g of the cellulose/latex polymer composite. The cooking process converted the latex polymer binder on the cellulose fiber to a soft, water soluble gel. The cellulose fiber was then strained and washed for 2 minutes with water at approximately 70° C. to remove the water soluble gel polymer.

It is interesting to note that because the composite was treated in a 2% NaOH solution, the pulp took on the properties of an alpha pulp, which is a high grade of cellulose fiber used in open web structures such as filter papers. This pulp has a low breaking length value if not further refined. Part of this pulp was made into a handsheet and a second part was moderately refined in a laboratory Waring ® blender for five minutes to increase the breaking length properties. The results were as follows:

|  | Breaking length average (km) |
|---|---|
| Repulped fiber | 1.0 |
| Repulped fiber plus Waring ® Blender refining | 2.7 |
| Original paper before latex saturation | 3.3 |

EXAMPLE II

The purpose of this experiment was to verify that repulping that was done on a small scale in the laboratory in Example I could be done on larger pilot plant equipment.

The equipment consisted of a high consistency repulper with a 70 liter capacity. The water in the repulper was steam heated to about 95° C. NaOH was added to make a 2% solution and 5,500 g of cellulose latex polymer composite, as in Example I, was added. The composite paper/latex slurry was about 8% and the starting pH was approximately 13.5.

The slurry mixed for 2.5 hours with no addition of heat. During this period the temperature dropped to 58° C. and the pH to 12.8. At the end of the period the consistency of the mix was the same as Example I. The slurry was washed with water heated to about 55° C. to remove all latex polymer. Handsheets were prepared as in Example I with similar physical properties.

EXAMPLE III

A water and stain resistant, durable printing paper used for navigational maps and shop manuals was repulped in a manner similar to that of Examples I and II.

The paper consisted of a cellulose-latex polymer (Rhoplex ® B-15 acrylic polymer from Rohm and Haas) basesheet. The basesheet was coated on both sides with a pigmented coating of clay, TiO$_2$ and an acrylic latex binder having a glass transition temperature (Tg) of about $+4°$ C. The weight of the durable printing paper was 180 g/m$^2$.

A slurry of 2% NaOH solution with 1% paper was cooked for 1 hour and 15 minutes at a temperature of 100° C. At one hour the paper began to disintegrate and at 1 hour and 15 minutes the composite structure disintegrated and the pulp was washed, recovered as in Example I and handsheets were prepared. These handsheets had the appearance of paper made from virgin pulp.

EXAMPLE IV

This experiment was carried out in the pilot repulper at a 8% slurry as in Example II. The repulped paper was a durable, water resistant, label paper consisting of a cellulose pulp base with an average breaking length of 5.0 km and 18 parts acrylic polymer (Rhoplex B-15) per 100 parts fiber. The basis weight was 50 g/m$^2$. The base material had a coating on one surface consisting of clay, TiO$_2$ pigment and an acrylic polymer binder of Hycar ® 26084 which had a Tg of $+4°$ C. The coating weight was 29 g/m$^2$. The web broke up in a manner similar to that of Example III giving a good quality reusable pulp.

EXAMPLE V

This experiment was a repeat of Example I using a 5% Na$_2$CO$_3$ solution and a 1% paper slurry. The pH of this system was 11.4. After 1 hour and 45 minutes of cooking there still remained some acrylic polymer after washing. This was determined by chemical stain analysis. (The pulp sample was stained with DuPont stain #4. The pulp turned bright green and the acrylic polymer was dark red thereby indicating that some latex polymer remained trapped on the fiber.) As a result, it appeared as though while Na$_2$CO$_3$ could to be effective in breaking up the cellulose latex polymer composite, the time to achieve clean fiber was noticeably longer than when using a stronger alkali such as NaOH or KOH.

The above experiments were related to acrylic ester polymers which are believed to be converted to polyacrylic acid salts which are water soluble and washed from the pulps. The following experiments use a different latex polymer.

EXAMPLE VI

The cellulose-latex polymer composite used in this experiment was similar to Example I with the only change being in the polymer type. In this case the polymer was an acrylonitrile butadiene type (Hycar ® 1562×28 by B. F. Goodrich Co.). After cooking the slurry for one and one half hours the polymer broke away from the fibers to form a useful pulp but the polymer did not dissolve in the alkali solution as in the case of the acrylic polymers. Instead, discrete polymer particles remained, their size being between 20 and 200 μm in diameter. It is believed, however, that these particles would not interfere with the making of a number of different cellulose polymer composites; artificial leather labels and book cover stock being but two examples.

EXAMPLE VII

Example VII was similar to Example VI except that a styrene butadiene type binder (Butofan ® 4262 from BASF) was used in place of the acrylonitrile polymer. The styrene butadiene fiber composite gave similar results to those obtained in Example VI and handsheets were prepared.

EXAMPLE VIII

This experiment was a repeat of Example II, but only the material partly converted to remove the latex binder from the fiber in the repulping process. In this case the experiment was stopped after one hour as opposed to 2.5 hours from complete conversion. The pulp composite was lightly washed in 55° C. water and the fibers were dispersed in a Waring ® blender at slow speed for 3 minutes. The fibers were uniformly dispersed in the water as with experiment II, but in this case much of the latex binder remained on the individual fibers.

Handsheets were prepared as in Example II. The paper had significantly stronger physical properties than the completely regenerated material of Example II because of the reinforcing characteristics of the latex binder on the fibers.

Note the improved tensile and stretch properties of this paper over that of experiment II which was more typical of virgin fiber.

|  | Example II | Example VIII |
|---|---|---|
| Basis weight (g/m²) | 50 | 50 |
| Dry Tensile (kg/m) | 193 | 278 |
| Dry Stretch at Break (%) | 3.6 | 6.7 |
| Wet Tensile (kg/m) | zero | 5.7 |

EXAMPLE IX

In this experiment a 50/50 blend of pulp from Example VIII along with virgin pulp was made into handsheets. In this case physical properties were between those of Example II and VIII.

EXAMPLE X

In this experiment a 50/50 blend of pulp from Example II (before it was washed) and virgin pulp was mixed in a Waring ® blender at slow speed for 3 minutes. The fibers were uniformly dispersed in the water as in Examples VIII and IX. Handsheets were prepared as in Examples VIII and IX.

Having thus described the process of the present invention in detail, it should be apparent that various modifications and changes can be made without departing from the spirit and scope of the following claims.

What is claimed is:

1. A process for reclaiming fiber from a web containing a latex binder comprising the steps of:
   a. combining said web with an alkali solution to form a slurry;
   b. allowing said slurry to react for a sufficient time to release said binder from said fibers; and
   c. washing said slurry in an aqueous solution which has been acidified in a pH value less than or equal to 6 to remove said latex binder from said slurry thereby leaving the fibers.

2. A process for reclaiming fiber from a web containing latex binder comprising the steps of:
   a. combining the web with an alkali solution to form a slurry;
   b. elevating the temperature of said slurry and allowing said slurry to react for a sufficient time to release the latex binder from the fiber; and
   c. washing the slurry in an aqueous solution which has been acidified to a pH value less than or equal to 6 to remove the latex binder from said slurry, thereby leaving the fibers.

3. A process for reclaiming fiber from a web containing latex binder comprising the steps of:
   a. combining the web with a 2% alkali solution to form a slurry;
   b. heating said slurry to a temperature above 70° C. and allowing said slurry to react until the latex binder releases from the fiber; and
   c. washing the slurry at a temperature above 55° C. in an aqueous solution which has been acidified to a pH value less than or equal to 6 to remove the latex binder from said slurry, thereby leaving the fibers.

4. The process of claim 3, wherein said alkali solution contains sodium hydroxide.

5. The process of claim 3, wherein said alkali solution has a pH equal to or greater than 12.5

6. The process of claim 3, wherein said alkali solution has a pH equal to or greater than 13.

7. The process of claim 3, which further includes the step of stirring said slurry to facilitate the removal of the latex binder from the fibers.

8. The process of claim 3, wherein the web contains a polyacrylic ester binder.

* * * * *